UNITED STATES PATENT OFFICE.

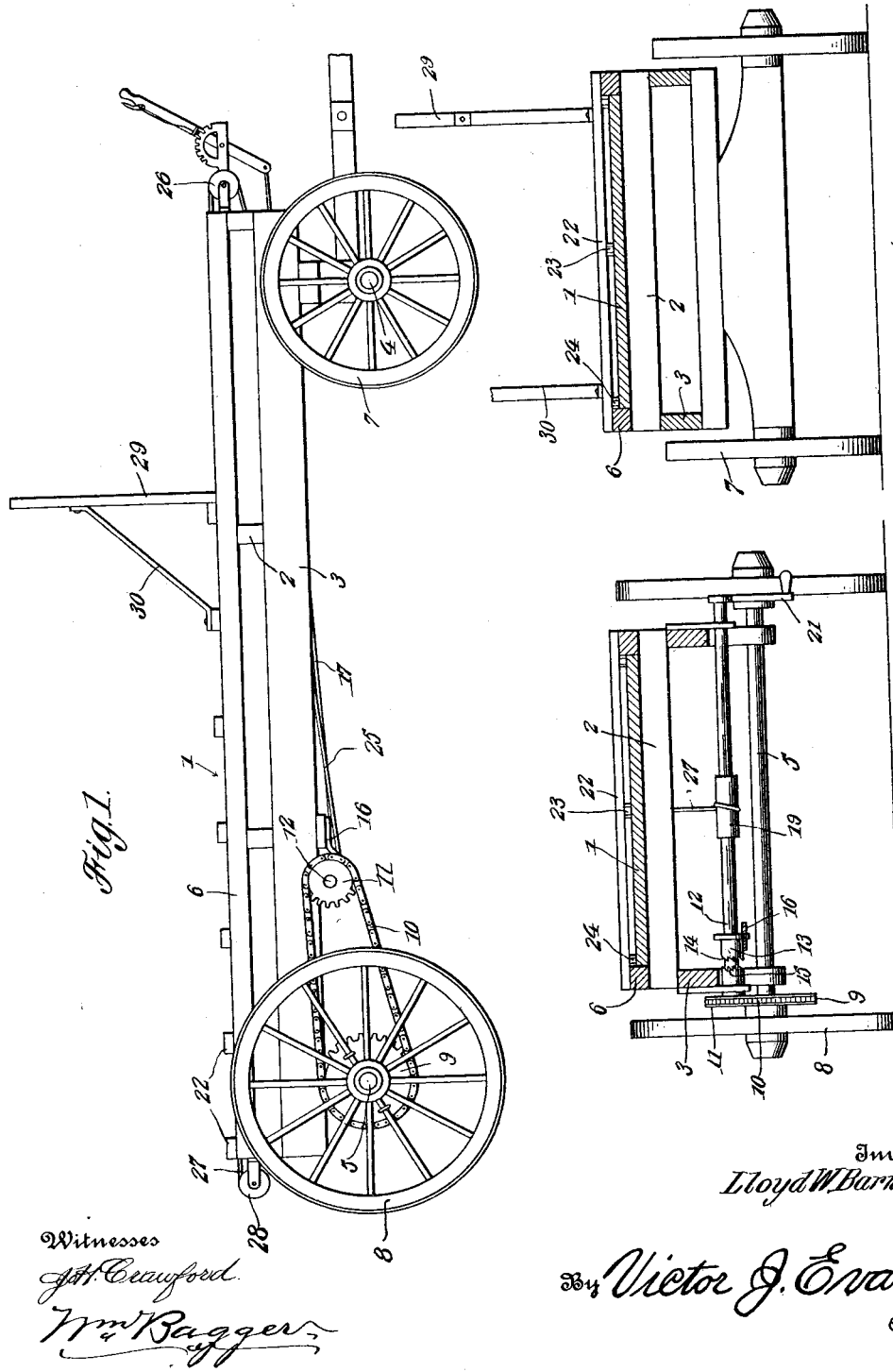

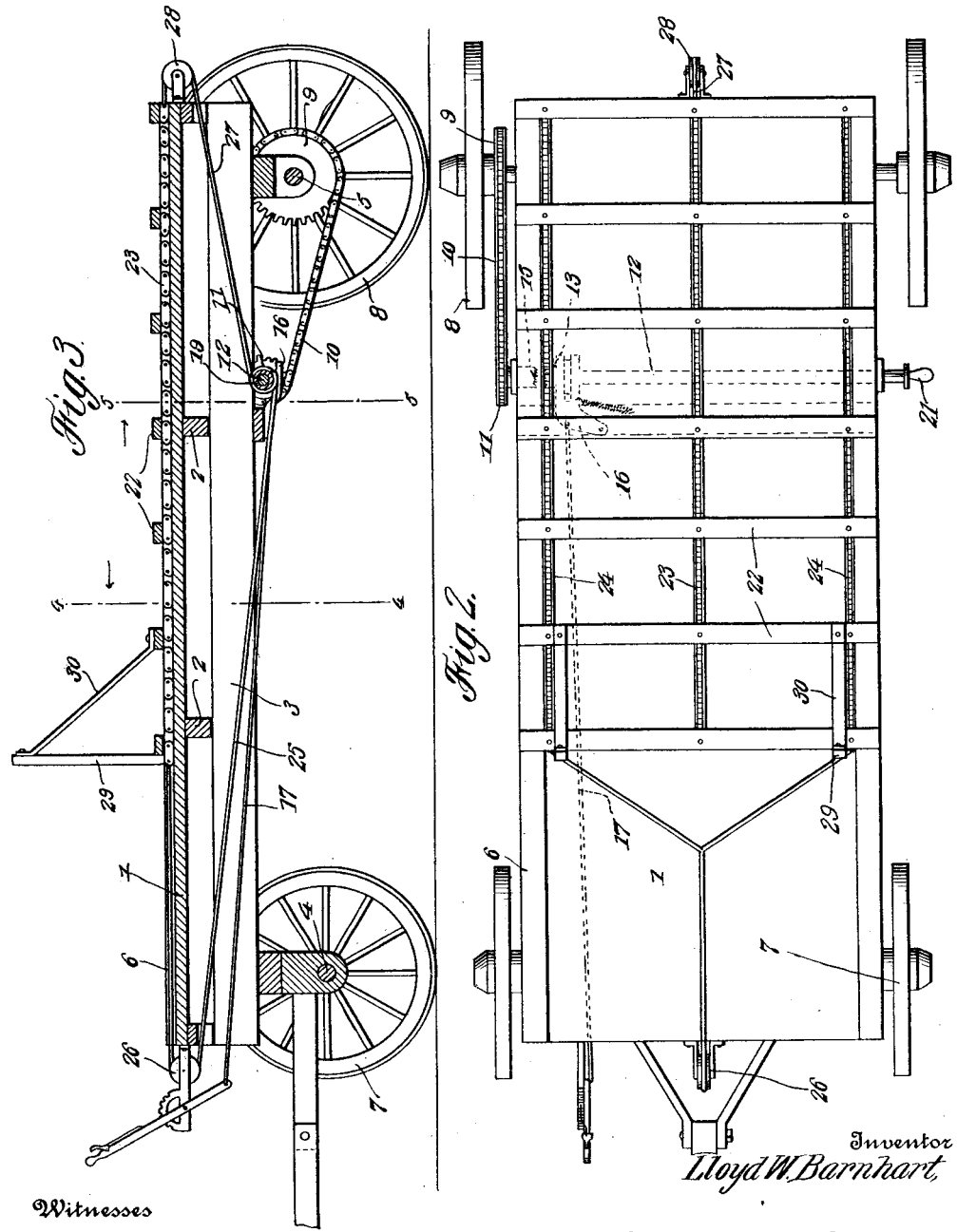

LLOYD W. BARNHART, OF MIDDLE POINT, OHIO.

HAY-LOADING DEVICE.

1,030,155.  Specification of Letters Patent.  Patented June 18, 1912.

Application filed September 20, 1911. Serial No. 650,311.

*To all whom it may concern:*

Be it known that I, LLOYD W. BARNHART, a citizen of the United States, residing at Middle Point, in the county of Van Wert and State of Ohio, have invented new and useful Improvements in Hay-Loading Devices, of which the following is a specification.

This invention relates to hay loading devices, and it has for its object to provide a simple, inexpensive and efficient loading attachment which may be readily applied to any ordinary hay wagon for the purpose of moving the load which is placed on the rear end of the wagon bed in a forward direction, thus enabling the loading to be speedily and effectively completed.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation showing the invention applied to a hay wagon of ordinary construction. Fig. 2 is a top plan view. Fig. 3 is a longitudinal vertical sectional view. Fig. 4 is a vertical transverse sectional view taken on the line 4—4 in Fig. 3. Fig. 5 is a vertical transverse sectional view taken on the line 5—5 in Fig. 3.

Corresponding parts in the several figures are denoted by like characters of reference.

1 designates the bed of an ordinary hay rack which is mounted on cross pieces 2, 2 resting on sills 3, 3 which are supported upon the front and rear axles 4 and 5. The bed 1 is provided adjacent to the side edges thereof with longitudinally disposed cleats 6 constituting upwardly extending flanges.

The front and rear axles are provided with transporting wheels 7 and 8, and one of the rear wheels is provided with a sprocket wheel 9 which is connected by a chain 10 with a sprocket wheel 11 upon a shaft 12 which is supported for rotation in suitable bearings upon the undersides of the sills 3. The sprocket wheel 11 is normally loose upon the shaft 12, and the latter is provided with a slidable sleeve 13 which is keyed or feathered upon said shaft and which is provided at one end with a clutch member 14 adapted to engage a corresponding clutch member 15 upon the hub of the sprocket wheel 11. A spring actuated shipping lever 16 engages the sleeve 13, said shipping lever being capable of being actuated by a pull rope 17 which may be grasped directly by the operator, or which may be connected with a suitable hand lever whereby it may be actuated.

The shaft 12 is provided with a drum 19 disposed intermediately between the middle portion and the ends of said shaft. Said shaft is also provided adjacent to one end with a crank 21, whereby it may be rotated.

Supported upon the bed 1 is a carrier composed of slats or cross pieces 22 which are suitably bolted or otherwise secured upon longitudinally disposed flexible members, such as chains 23 and 24, one of said chains or flexible members, 23, being disposed intermediate the ends of the slats, while the chains 24 are disposed adjacent to the ends of the slats but in such a manner as to rest upon the bed 1 and be guided adjacent to the flanges formed by the cleats 6, while the terminal ends of the slats or cross pieces 22 are permitted to ride upon the said cleats.

The front end of the carrier is connected by a cord or cable 25 with the drum 19 upon the shaft 12, said cord or cable 25 being guided over a pulley 26 supported for rotation at the front end of the bed 1. The rear end of the carrier is connected by a cord or cable 27 with the drum 19 upon the shaft 12, said cable being guided over a pulley 28 adjacent to the rear end of the bed 1. The cables 25 and 27 are oppositely wound on the drum 19, as shown. The carrier is provided at its front end with uprights 29 secured upon the foremost slat 22 and connected by means of inclined braces 30 with the second slat of said carrier.

One of the rear supporting wheels of the running gear is provided with the sprocket wheel 9 which is connected by means of the chain 10 with the sprocket wheel 11 upon the shaft 12 to which motion will thus be transmitted from the transporting wheel when the clutch members of the sleeve of the sprocket wheel are placed in engagement with each other.

From the foregoing description, taken in connection with the drawings hereto annexed, the operation and advantages of this invention will be readily understood by those skilled in the art to which it appertains. Initially the carrier occupies a position adjacent to the rear end of the wagon bed, and hay is piled thereon in the usual or in any convenient manner. After a load has been deposited upon the carrier, the clutch means connecting the sprocket wheel 9 with the shaft 12 is thrown into engagement, and the wagon is moved forwardly. The shaft 12 will thus be rotated, causing the flexible cable 25 to be wound upon the drum 19, thereby moving the carrier and the load supported thereon in a forward direction upon the wagon bed. Loading may now be resumed, the load being placed directly upon the wagon bed in rear of the carrier. It will be seen that by this simple and convenient contrivance the operator who drives the team is enabled without actual manual labor to move the load from a rearward position forwardly upon the wagon bed, thereby saving considerable labor and handling of the load. After unloading in order to restore the carrier to its initial position it is only necessary to disengage the clutch, after which the shaft 12 may be rotated in the proper direction by means of the crank or handle 21.

Having thus described the invention, what is claimed as new, is:—

1. In a device of the character described, a vehicle bed having longitudinally disposed flanges at the side edges thereof, a carrier movable longitudinally upon said bed, said carrier comprising a plurality of flexible connecting members and cross pieces associated therewith, a shaft supported for rotation adjacent to the underside of the bed, means for rotating said shaft, and flexible means wound oppositely on said shaft and connecting the same with the front and rear ends of the carrier.

2. In a device of the character described, a vehicle bed, a carrier movable longitudinally upon said bed, a shaft supported for rotation adjacent to the underside of the bed, a drum upon said shaft, suitably guided flexible members connecting said drum with the front and rear ends of the carrier, said flexible member being oppositely wound on the drum, means for transmitting motion from a transporting wheel of the vehicle to the shaft to rotate the latter in one direction, and means independent of said motion transmitting means for rotating the shaft in the opposite direction.

3. In a device of the character described, a vehicle bed having guides at the side edges thereof, a carrier movable between said guides, said carrier having standards adjacent to the front ends thereof, a shaft supported for rotation adjacent to the underside of the bed, means for connecting said shaft with the front and the rear ends of the carrier, said means being suitably guided over the front and rear ends of the vehicle bed, means for transmitting motion from the supporting means of the vehicle to the shaft to rotate the latter in one direction, and means for manually rotating the shaft in the opposite direction.

In testimony whereof I affix my signature in presence of two witnesses.

LLOYD W. BARNHART.

Witnesses:
E. F. FERGUSON,
EDWARD C. STITZ.

Copies of this patent may be obtained for five cents each, by addressing the "Commissioner of Patents, Washington, D. C."